Aug. 25, 1942.                W. W. BROWN                 2,293,800
                  LINE HITCH AND METHOD OF FORMING THE SAME
                           Filed Aug. 14, 1941
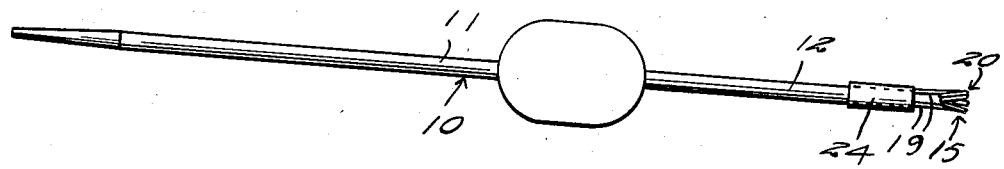
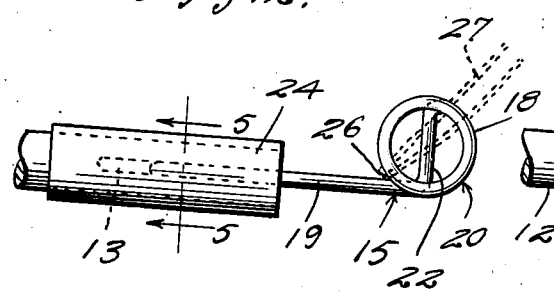
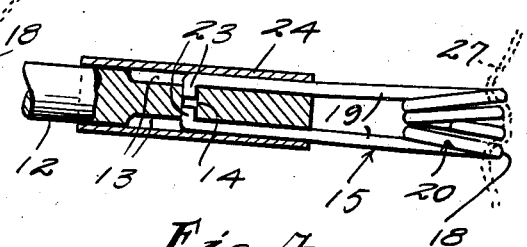
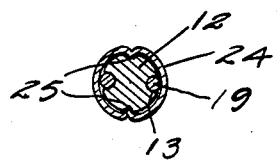
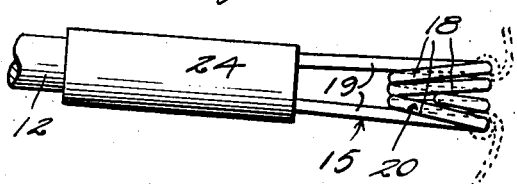
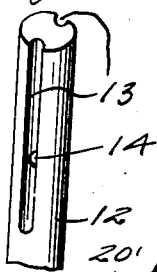
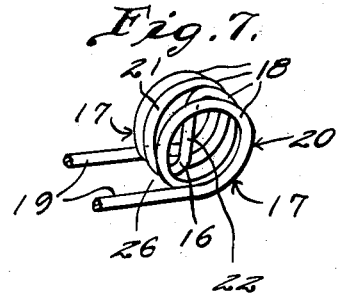
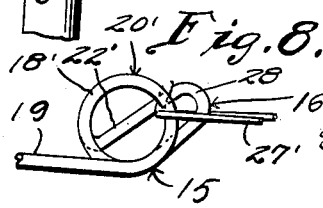
Inventor
W. W. Brown
By L. F. Randolph
Attorney Patented Aug. 25, 1942

2,293,800

UNITED STATES PATENT OFFICE 2,293,800

LINE HITCH AND METHOD OF FORMING THE SAME

William W. Brown, Warren, Ind.

Application August 14, 1941, Serial No. 406,893

8 Claims. (Cl. 24—131)

This invention relates to a novel construction of hitch to which a line may be quickly attached or detached, and to the method of forming the hitch from a single strand of resilient wire or the like.

More particularly, it is an aim of the invention to provide a line hitch including a spring coil the end convolutions of which are wound in the same direction and the terminal portions of which project from the coil in the same direction so that a line may be readily drawn into the coil between the coil and its projecting terminals for clamping portions of the line between the resilient end convolutions of the coil and from which the line may be readily removed by drawing it in the opposite direction.

It is a particular object of the invention to provide a hitch especially adapted to be attached to articles of fishing tackle such as floats, sinkers, spreaders and lures to provide means whereby a fishing line can be quickly and easily attached thereto without forming a knot in the line and from which the line may be readily removed; however, it is to be understood that the use of the hitch is not restricted to its use with articles of fishing gear, but that it can be used with any other articles to which a line is attached.

Still a further aim of the invention is to provide a hitch having no rough edges or exposed points which would tend to cut or fray a line, and which is provided with smooth, preferably round surfaces for frictionally and resiliently engaging portions of the line for securely attaching the hitch thereto.

Other objects and advantages of the invention will hereinafter become more fully apparent from the following description of the drawing, which illustrates preferred embodiments thereof, and wherein:

Figure 1 is a top plan view showing the hitch attached to a fishing float,

Figure 2 is an enlarged side elevational view of the hitch and the attached end of the float and showing a cord or line, in dotted lines, in a position preparatory to be moved into engagement with the clamping means of the hitch, Figure 3 is a top plan view, partly in section of the same, and showing the line, in dotted lines, secured to the hitch, Figure 4 is a top plan view of the hitch and the adjacent portions of the float and showing a line, in dotted lines, clamped thereto in a different manner than the manner shown in Figure 3, Figure 5 is a cross sectional view taken substantially along the plane of the line 5—5 of Figure 2, Figure 6 is a perspective view of the end of the float to which the hitch is connected with the hitch and retaining sleeve removed, Figure 7 is an enlarged, fragmentary perspective view of the hitch, and Figure 8 is a fragmentary side elevational view of a slightly modified form of the hitch.

Referring more particularly to the drawing, wherein like reference characters designate like or corresponding parts throughout the different views, 10 designates generally a fishing float having a stem 11, the upper end 12 of which is provided with diametrically opposed longitudinally extending grooves 13, as best seen in Figures 3 and 6. The end 12 is also provided with a transverse bore 14, the ends of which open into the beds of the grooves 13, intermediate of the ends thereof.

15 designates generally a hitch constructed in accordance with the invention and which is formed from a single strand of wire. Said strand is folded upon itself intermediate of its ends and the intermediate portion 16 thereof is twisted through an arc of substantially 45 degrees. The end portions or legs 17 of the strand are coiled or wound from the intermediate portion and in the same direction to form the convolutions 18 and the terminal portions 19 of the legs 17 project from the ends of the coil spring, designated generally 20, and which is formed by the convolutions 18 and the intermediate portion 16, in the same direction and from substantially the same point or position relatively to the circumference of the coil spring 20. Each leg 17 is preferably coiled to form one and one-half convolutions and the intermediate portion 16 is disposed therebetween and includes an outer arcuately shaped part 21 which forms a part of a convolution of the spring coil 20 and an inner part 22 which is disposed within and diametrically of the coil 20. The convolutions 18 are adapted to normally be disposed in substantially abutting relationship and are resiliently disposed relatively to one another.

As best seen in Figure 3, parts of the terminal portions 19, adjacent the free ends 23 thereof, are adapted to be disposed in the outer ends of the grooves 13 and the free ends 23 are turned inwardly toward one another to engage in the bore 14 for securing the hitch 15 to the end 12 of the stem 11. The end 12 carries a retaining sleeve 24 which is adapted to be slid into position over the portions of the terminals 19, which engage the grooves 13 for holding said parts therein and for retaining the free ends 23 in engagement with the bore 14 for securely anchoring the hitch to the float 10. This connection can be made permanent by pressing in portions of the sleeve 24, as seen in Figure 5, to form inwardly extending projections 25 which penetrate the end 12 for anchoring the sleeve 24 in a fixed position thereon. It is to be understood that aside from the end 12 and the parts carried thereby, the float 10 can be of any conventional construction or design. Furthermore, the hitch 15 can be attached to any other article or device to which a line is adapted to be connected and may be attached thereto in any other suitable manner as the manner, illustrated, for attaching the hitch 15 to the float 10 is only intended to illustrate one means for accomplishing this result.

The terminal of the end 12 is spaced from the spring coil 20. The parts of the terminal portions 19 which are disposed adjacent to the coil 20 combine with portions of the convolutions 18 to form a throat 26, as best seen in Figure 2. A line, shown in dotted lines in Figures 2 and 3, at 27, is adapted to have a portion thereof placed in the throat 26, as seen in Figure 2, after which the ends of the line 27 may be pulled in a direction away from the float 10 for moving the cord 27 to the position as seen in Figure 3, in which position the cord will be disposed in the outer part of the coil 20 and with portions thereof resiliently held and clamped between the outer two convolutions 18 to thereby frictionally clamp the cord 27 to the hitch 15. To detach the line 27 from the hitch 15, when secured thereto as seen in Figure 3, the ends of the line 27 are pulled downwardly and toward the float 10 to readily release the line 27. The connection as shown in Figure 3 will hold a line sufficiently secure for most purposes, but if a more secure connection is required the line 27 can be attached to the hitch 15 in the manner as illustrated in Figure 4. This is accomplished by looping the line and passing the loop thereof upwardly between the exposed parts of the terminal portions 19, then outwardly and over the coil 20 after which the ends of the cord 27 are drawn taut so that portions thereof will be looped around the two terminal portions 19. The ends of the cord 27 are then pulled in a direction away from the float 10 to move the looped portions into engagement with the outer convolutions 18 for clamping parts thereof between the outer pairs of convolutions 18. This connection, as illustrated in Figure 4, will hold the line 27 very secure so that a pull on either end thereof cannot pull the line out of engagement with the hitch 15. To release the line 27 when attached as in Figure 4, the ends of the line are pulled downwardly and toward the float 10 to move the cord out of engagement with the convolutions 18 after which a pull on either end of the line 27 will readily disengage it from the terminal portions 19.

A slightly modified form of the invention is shown in Figure 8. This form of the hitch, designated generally 15', is of the same construction as the hitch 15, except that the intermediate portion 16' is modified. The intermediate portion 16' is turned in a counterclockwise direction, as seen in Figure 8, through an arc of approximately 135 degrees, so that its portion 22' is disposed obliquely to the terminal portions 19' and extends downwardly and towards portions 19', instead of being disposed substantially at a right angle thereto, as in the hitch 15. The portion 16' is elongated, as compared to the portion 16, so that the bend of the portion 16' projects outwardly from the coil 20' to form a projection 28 which extends outwardly and upwardly from the coil 20'. The remainder of the hitch 15' is of the same construction as the hitch 15, and is intended to be mounted in the same manner.

A length of line or cord 27', as seen in full lines in Figure 8, is intended to be applied to or removed from the hitch 15' in the same way, as heretofore described, that the line 27 is applied and removed, as shown in Figures 2 and 3. However, after the line 27' is applied and gripped by the outer pairs of convolutions 18', the part of the line 27', between the portions thereof which are gripped, is pushed over the projection 28 and the ends of the line are pulled tight to position the line 27', as seen in Figure 8. When thus engaged, the line 27' cannot be disengaged by a pull on the ends of the line 27 in a direction toward the free ends of the portions 19'. Consequently, accidental disengagement of the line is prevented because the aforementioned part of the line must be passed back over projection 28 before it can be disengaged.

Various modifications and changes are contemplated and may obviously be resorted to, provided they fall within the spirit and scope of the invention as hereinafter defined by the appended claims, as only a preferred embodiment of the invention has been illustrated and described.

I claim as my invention:

1. A line hitch comprising an elongated resilient member, said member being folded upon itself intermediate of its ends and having its intermediate portion twisted to provide the intermediate portion of said hitch, the portions of the elongated member, adjacent said intermediate portion, being coiled in the same direction to form convolutions, said convolutions being disposed in substantially abutting relationship, and the terminals of said elongated member extending from the ends of the coil formed by said convolutions in the same direction and from the same side thereof.

2. A hitch as in claim 1, said intermediate portion of the elongated member being disposed between the intermediate convolutions thereof.

3. A hitch as in claim 1, said intermediate portion of the elongated member being disposed between the intermediate convolutions thereof, one part of said intermediate portion forming a part of a convolution of the coil, and the other part of said intermediate portion extending substantially diametrically through the coil.

4. A hitch as in claim 1, said coil comprising substantially one and one-half convolutions on each side of said intermediate portion.

5. A hitch as in claim 1, the terminals of said elongated member being anchored in a supporting member and at a distance from the coil.

6. A hitch as in claim 1, the portions of the terminals, adjacent to the coil, and portions of the convolutions of the coil combining to form a throat into which a portion of a line or the like is adapted to be drawn for clamping portions of the line between the convolutions of the coil, and said line being adapted to be disengaged from the coil by movement in the opposite direction and outwardly of the throat.

7. A hitch for fishing lines and the like comprising a single strand of resilient wire bent upon itself intermediate of its ends and twisted at the bend thereof to form an intermediate portion from which legs, forming the ends of the strand, extend, said legs being coiled adjacent the intermediate portion in the same direction to form resilient convolutions, said convolutions combining to form a coil spring having the convolutions thereof disposed in substantially abutting relationship, and the terminal portions of said legs projecting in the same direction from the ends of the coil spring and from substantially the same point relatively to its circumference.

8. A line hitch comprising an elongated resilient member, said member being folded upon itself intermediate of its ends and having its intermediate portion twisted to provide the intermediate portion of said hitch, the portions of the elongated member, adjacent said intermediate portion, being coiled in the same direction to form convolutions, said convolutions being disposed in substantially abutting relationshp, the terminals of said elongated member extending from the ends of the coil formed by said convolutions in the same direction and from the same side thereof, and said intermediate portion including a projection which extends outwardly from between the convolutions and which is adapted to be engaged by a part of a line which is clamped between the convolutions to prevent accidental release of the line therefrom.

WILLIAM W. BROWN.